US010127803B2

(12) United States Patent
Saito et al.

(10) Patent No.: US 10,127,803 B2
(45) Date of Patent: Nov. 13, 2018

(54) RADIO AND SLAVE CONTROL APPARATUS

(71) Applicant: OMRON Corporation, Kyoto-shi, Kyoto (JP)

(72) Inventors: Keisuke Saito, Suita (JP); Taiji Yoshikawa, Kizugawa (JP); Daichi Ueki, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/684,987

(22) Filed: Aug. 24, 2017

(65) Prior Publication Data

US 2017/0352260 A1 Dec. 7, 2017

Related U.S. Application Data

(63) Continuation of application No. PCT/JP2016/055761, filed on Feb. 26, 2016.

(30) Foreign Application Priority Data

Mar. 9, 2015 (JP) ................. 2015-045535

(51) Int. Cl.
*G08C 15/06* (2006.01)
*G08C 17/00* (2006.01)
(Continued)

(52) U.S. Cl.
CPC ............. *G08C 15/06* (2013.01); *G08C 17/00* (2013.01); *G08C 17/02* (2013.01); *H04L 12/28* (2013.01);
(Continued)

(58) Field of Classification Search
CPC ........ G08C 15/06; G08C 17/02; H04W 84/18; H04W 84/20; H04W 84/22; H04W 88/16
See application file for complete search history.

(56) References Cited

U.S. PATENT DOCUMENTS

2006/0077917 A1* 4/2006 Brahmajosyula ... H04L 12/4625
370/310
2010/0124232 A1 5/2010 Takada et al.
(Continued)

FOREIGN PATENT DOCUMENTS

EP       2466986 A1    6/2012
JP     2006-211480 A   8/2006
(Continued)

OTHER PUBLICATIONS

English translation of Written Opinion of PCT/JP2016/055761 dated May 10, 2016.
(Continued)

*Primary Examiner* — Laura Nguyen
(74) *Attorney, Agent, or Firm* — Metrolexis Law Group, PLLC

(57) ABSTRACT

Provided is a radio formed to be capable of performing wireless communication with sensors, and configured to be connected, through one communication port via wired communication, to a slave control apparatus configured to be communicably connected to a master control apparatus with a predetermined communication method. The radio generates one communication packet formed with the predetermined communication method and transmitted from the radio to the slave control apparatus, such that pieces of measured data measured by the sensors are included in the one communication packet in accordance with a predetermined order in which the slave control apparatus or the master control apparatus can determine which sensor measured which piece of the measured data of the sensors, and the radio transmits the generated one communication packet to the slave control apparatus via wired communication.

5 Claims, 6 Drawing Sheets

(51) Int. Cl.
*H04L 12/28* (2006.01)
*H04L 12/46* (2006.01)
*H04M 11/00* (2006.01)
*H04Q 9/00* (2006.01)
*H04W 4/04* (2009.01)
*H04W 92/10* (2009.01)
*G08C 17/02* (2006.01)
*H04L 12/40* (2006.01)
*H04W 84/22* (2009.01)
*H04W 88/16* (2009.01)
*H04L 29/08* (2006.01)

(52) U.S. Cl.
CPC ........ *H04L 12/40169* (2013.01); *H04L 12/46* (2013.01); *H04M 11/00* (2013.01); *H04Q 9/00* (2013.01); *H04W 4/04* (2013.01); *H04W 92/10* (2013.01); *H04L 67/12* (2013.01); *H04L 2012/4026* (2013.01); *H04W 84/22* (2013.01); *H04W 88/16* (2013.01)

(56) References Cited

U.S. PATENT DOCUMENTS

2010/0332706 A1* 12/2010 Hering ................ G06F 13/4295
710/106
2014/0337550 A1* 11/2014 Boeck ................ G06F 13/4295
710/107

FOREIGN PATENT DOCUMENTS

| | | | |
|---|---|---|---|
| JP | 2006211480 A | * | 8/2006 |
| JP | 2009-49933 A | | 3/2009 |
| JP | 2014-116811 A | | 6/2014 |

OTHER PUBLICATIONS

International Search Report of PCT/JP2016/055761 dated May 10, 2016.

European search report dated Feb. 20, 2018 in a counterpart European Patent application.

* cited by examiner

FIG. 5A

| Superimposition order | Sensor ID |
|---|---|
| 1 | x002a |
| 2 | x002b |
| 3 | x002c |

FIG. 5B

| Superimposition order | Sensor ID | Memory address |
|---|---|---|
| 1 | x002a | x000010 |
| 2 | x002b | x000020 |
| 3 | x002c | x000030 |

RADIO AND SLAVE CONTROL APPARATUS

CROSS REFERENCE TO RELATED APPLICATIONS

This application is a continuation application of International Application No. PCT/JP2016/055761, filed on Feb. 26, 2016, which claims priority based on the Article 8 of Patent Cooperation Treaty from prior Japanese Patent Application No. 2015-045535, filed on Mar. 9, 2015, the entire contents of which are incorporated herein by reference.

TECHNICAL FIELD

The disclosure relates to a radio that is connected to a system constituted by a master control apparatus and a slave control apparatus via the slave control apparatus.

RELATED ART

In a system having a master control apparatus and a plurality of slave control apparatuses, by placing the slave control apparatuses under the control of the master control apparatus, it is possible to allocate various processes to the control apparatuses and to allow the overall system to execute complicated processing. Such a system is utilized in various fields, and for example, with technology disclosed in Patent Document 1, by connecting a master control apparatus and a plurality of slave control apparatuses through wireless communication, constraints relating to the arrangement between control apparatuses are basically removed, and the system can be constructed without physical restriction. However, in such a system, in order to achieve operational cooperation between control apparatuses, it is necessary to synchronize the control apparatuses. In view of this, in order to achieve synchronization, a network clock of a wireless network is utilized.

RELATED ART DOCUMENTS

Patent Documents

Patent Document 1: JP 2014-116811A

SUMMARY OF THE INVENTION

Problem to be Solved by the Invention

In the field of FA (factory automation) as well, a mode is widely utilized in which various control devices are connected to a system formed by connecting a master control apparatus and slave control apparatuses with a predetermined communication method, and driving of the control apparatuses is controlled by a control signal transmitted from the master control apparatus. In particular, control apparatuses and the like relating to the FA field are used in a manufacturing line in a factory, and thus regulative stability is strongly required. Thus, conventionally, there is a tendency to avoid transmission and reception of signals between control apparatuses via wireless communication. This is because in the case of wireless communication, transmission and reception of signals will not always necessarily succeed due to noise in the factory or the like.

Meanwhile, in the FA field as well, in recent years, when data measured by sensors is collected, in order to efficiently transfer data from the sensors that are disposed in a wide range to the control apparatuses, there is a need to utilize wireless communication. However, as described above, because wireless communication has not been positively utilized in the FA field so far, sufficient studies have not been conducted on a configuration for collecting data measured by the sensors via wireless communication. Merits for utilizing wireless communication include elimination of the need to connect the sensors and the control apparatuses with cables and enabling the control apparatuses and the sensors to be disposed relatively freely. Thus, when a radio is introduced, in order to maximize the merit of converting to wireless, the number of wired connections between the radio and the control apparatuses need be reduced as much as possible.

One or more embodiments have been made in view of such a problem, and one or more embodiments can provide technology for maximizing the merit of radio usage when the radio is introduced to a system constituted by a master control apparatus and slave control apparatuses in the FA field.

Means for Solving the Problems

In order to resolve the above-described issues, in one or more embodiments, a mode is adopted in which a radio that is capable of performing wireless communication with a plurality of sensors is connected with a cable through one communication port of a slave control apparatus. Accordingly, data measured by the plurality of sensors is transmitted to the slave control apparatus through one cable, and the merit of radio usage can be increased.

Specifically, a radio according to one or more embodiments is a radio formed to be capable of performing wireless communication with a plurality of sensors, and configured to be connected, via wired communication, to a slave control apparatus configured to be communicably connected to a master control apparatus with a predetermined communication method, the radio including a connection unit that connects the radio to the slave control apparatus such that the wired communication can be performed through one communication port among a plurality of communication ports provided in the slave control apparatus, a storage unit that receives, via the wireless communication, and stores pieces of measured data that were respectively measured by the plurality of sensors, a generation unit that generates one communication packet that is formed with the predetermined communication method and is to be transmitted from the radio to the slave control apparatus, such that the pieces of measured data respectively measured by the plurality of sensors are included in the one communication packet in accordance with a predetermined order in which the slave control apparatus or the master control apparatus can determine which sensor measured which piece of the measured data that is stored in the storage unit, and a transmission unit that transmits the one communication packet generated by the generation unit to the slave control apparatus via the wired communication.

A communication method used in the FA field, such as IO link or Asi-bus, can be utilized as a predetermined communication method utilized between the master control apparatus and the slave control apparatus. Here, the slave control apparatus is a control apparatus that is placed under the control of the master control apparatus in terms of communication when control apparatuses having equal functions are connected in a bus configuration. Therefore, the slave control apparatus is subordinated to the master control apparatus in terms of communication, and, in accordance with an instruction from the master control apparatus, the slave control apparatus is controlled by the master control apparatus, and, furthermore, a driving device connected to the slave control apparatus is also controlled in accordance with an instruction from the master control apparatus.

Here, the radio according to one or more embodiments is connected to the slave control apparatus through one communication port of the slave control apparatus so as to be capable of performing wired communication with the slave control apparatus, and the radio is configured to be capable of performing wireless communication with a plurality of sensors. By connecting the slave control apparatus and the radio with one cable through only one communication port in this manner, communication therebetween is secured with the minimum number of cables. Thus, it is possible to suppress the demerit of wired connection as much as possible and to increase the merit of radio usage. Meanwhile, because the radio and the slave control apparatus are connected to each other with one cable, when data measured by the sensors is wirelessly transferred from the sensors to the radio, the measured data is delivered from the radio to the slave control apparatus via one cable. That is, one cable is shared in the transfer of the data measured by the sensors to the slave control apparatus.

Moreover, when the data measured by the sensors is transmitted from the radio to the slave control apparatus, one communication packet for transmission is generated by a generation unit in a state in which the data measured by the sensors is included in the one communication packet in accordance with a predetermined order. This predetermined order is the order that the slave control apparatus or the master control apparatus can grasp which sensor measured the measured data included in one communication packet. In order for the slave control apparatus or the master control apparatus to be capable of grasping the predetermined order in this manner, for example, the slave control apparatus or the master control apparatus need only have information in which the order in which the measured data is included in one communication packet and the identification information of the sensors are associated with each other.

One communication packet generated by the generation unit is transmitted from the radio to the slave control apparatus by a transmission unit, and in some cases, the one communication packet is transmitted to the master control apparatus. The slave control apparatus or the master control apparatus that received the one communication packet grasps the association between the predetermined order and the sensors, and thus can grasp which sensor measured which piece of the measured data included in the one communication packet.

As described above, a radio according to one or more embodiments is capable of performing wireless communication with a plurality of sensors and maximizing the merit of radio usage by realizing connection between the radio and a slave control apparatus with only a cable. Also, one communication packet includes pieces of data that are measured by the plurality of sensors and superimposed on one another in accordance with a predetermined order, and thereby it is possible to achieve reliable collection of the measured data without inhibiting the merit of the above-described radio.

Here, the above-described radio may further include an identification information collection unit that collects pieces of identification information for respectively identifying the sensors from the sensors, when the radio is initially connected to the plurality of sensors via the wireless communication, and a notification unit that notifies the slave control apparatus or the master control apparatus of the pieces of identification information of the plurality of sensors collected by the identification information collection unit and correlation information relating to correlation with the predetermined order, when the radio is initially connected to the slave control apparatus via the wired communication. By the notification unit notifying the slave control apparatus or the master control apparatus of the correlation information in which the identification information, collected by the identification information collection unit of the radio, of the sensor that is capable of performing wireless connection is associated with the predetermined order, as described above, the slave control apparatus or the master control apparatus can grasp which sensor measured the measured data included in the one communication packet.

Note that in the radio according to one or more embodiments, initial connection between the radio and the sensors and initial connection between the radio and the slave control apparatus include not only a state in which the radio and the sensors are physically connected to each other and a state in which the radio and the slave control apparatus are physically connected to each other but also a state in which it becomes possible for signals to be transmitted and received between the radio and the sensors and between the radio and the slave control apparatus for the first time. That is, this initial connection refers to a state in which it becomes possible for signals to be substantively transmitted and received between the radio and the sensors and between the radio and the slave control apparatus.

Here, in the above-described radio, the slave control apparatus may transmit, to the master control apparatus, the pieces of measured data included in the one communication packet transmitted from the transmission unit, in a state in which each piece of the measured data is linked with a corresponding one of the plurality of sensors, based on the correlation information. Accordingly, the master control apparatus can grasp the measured data in a state in which the plurality sensors and the pieces of measured data are associated with each other, and appropriately analyze and utilize the measured data in various processes in which the measured data is utilized.

Here, in the above-described radio, the slave control apparatus may be connected to the master control apparatus such that wired communication can be performed through another communication port that is different from the one communication port among the plurality of communication ports provided in the slave control apparatus. As a result, with the slave control apparatus to which the radio according to one or more embodiments is connected, wired communication between the radio and the master control apparatus is established by a cable between the slave control apparatus and the radio and a cable between the slave control apparatus and the master control apparatus. Thus, the number of communication ports provided in the slave control apparatus that are used for this wired communication can be suppressed as much as possible, and accordingly the merit of radio usage can be maximized.

Also, in the above-described radio, as one example, the radio may be integrally formed with the slave control apparatus.

Also, one or more embodiments can be taken from the aspect of a slave control apparatus. That is, one or more embodiments may be a slave control apparatus configured to be communicably connected to a master control apparatus with a predetermined communication method, the slave control apparatus including a connection unit that connects to a radio formed to be capable of performing wireless communication with a plurality of sensors, such that wired communication can be performed through one communication port among a plurality of communication ports provided in the slave control apparatus, a reception unit that receives one communication packet formed with the predetermined communication method from the radio, the one communication packet being generated such that pieces of measured data respectively measured by the plurality of sensors are included in the one communication packet in accordance with a predetermined order in which the slave control apparatus can determine which sensor measured which piece of the measured data of the plurality of sensors, and a dividing unit that performs division processing on each of the pieces of measured data that are included in the one communication packet received by the reception unit, based on the predetermined order, into a state in which each piece of the measured data is linked with a corresponding one of the plurality of sensors. Accordingly, when the radio is introduced in a system constituted by the master control apparatus and the slave control apparatus in the FA field, it is possible to maximize the merit of radio usage. Note that the technical idea of the invention of this application disclosed in relation to the above-described radio can also be applied to the slave control apparatus as long as no technical discrepancy arises.

Effects of the Invention

When a radio is introduced in a system constituted by a master control apparatus and a slave control apparatus in the FA field, the merit of radio usage can be maximized.

BRIEF DESCRIPTION OF THE DRAWINGS

FIG. 5A is a diagram showing one example of a configuration of correlation information transmitted from a radio 1 to a slave control apparatus 30, and FIG. 5B is a diagram showing one configuration of correlation information transmitted from a slave control apparatus 30 to a master control apparatus 20.

EMBODIMENTS OF THE INVENTION

A control system to which a radio 1 according to one or more embodiments is connected, and that includes a master control apparatus 20 and a slave control apparatus 30, the radio 1 included in this control system, and the control apparatuses 20 and 30 will be described with reference to the drawings. Note that the configuration of the following embodiments is merely an example, and the present invention is not limited to the configuration of this embodiment.

Figure 1A:
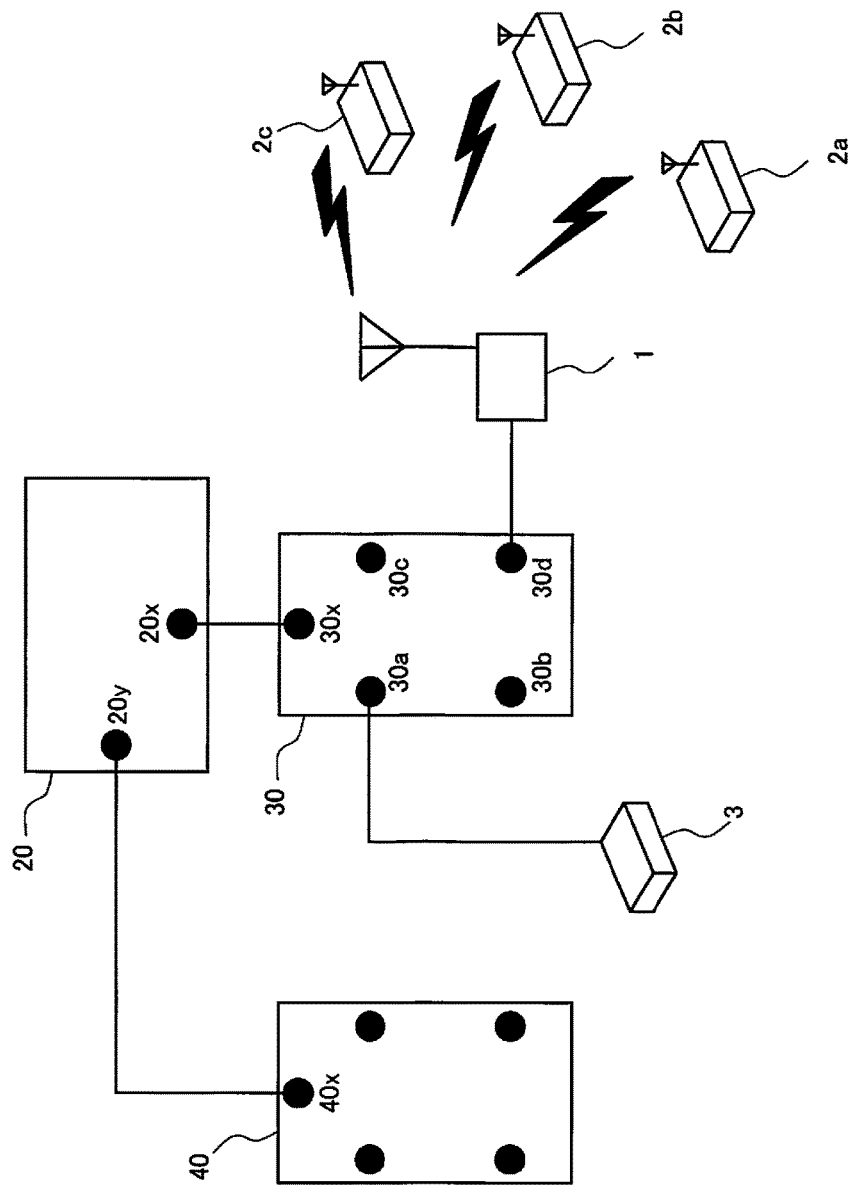
FIG. 1A is a diagram showing a schematic configuration of a system that is constituted by a master control apparatus and slave control apparatuses and to which a radio according to one or more embodiments is connected.

The control system shown in FIG. 1A is a system that is to be mainly used in the FA field and is formed by connecting two slave control apparatuses 30 and 40 to the master control apparatus 20. Moreover, a control signal and predetermined data are transferred between the control apparatuses in accordance with a predetermined communication method that is normally used in the FA field. Examples of this predetermined communication method include an IO link method and an Asi-bus method. Although a detailed description thereof is omitted in this specification because these communication methods are known in the FA field, for example, the IO link method is IO technology for enabling communication from the master control apparatus to the slave control apparatuses and to devices at the lowermost level that are connected thereto, and conforms to IEC 61131-9.

In the control system shown in FIG. 1A, the master control apparatus 20 includes a plurality of communication ports, and FIG. 1A shows communication ports 20x and 20y. The master control apparatus 20 is communicably connected to the slave control apparatuses 30 and 40 with cables through the communication ports. Note that communication between the master control apparatus 20 and the slave control apparatuses 30 and 40 is point-to-point communication. Here, the slave control apparatus 30 is connected to the master control apparatus 20 through the communication port 20x via a cable, and at this time, the communication port of the slave control apparatus 30 is a communication port 30x. Also, the slave control apparatus 40 is connected to the master control apparatus 20 through the communication port 20y via a cable, and at this time, the communication port of the slave control apparatus 40 is a communication port 40x.

In this embodiment, the slave control apparatus 30 will be described in detail. The slave control apparatus 30 includes four communication ports 30a to 30d in addition to the communication port 30x. A device at a lower layer is connected to each communication port, and specifically, a sensor 3 is connected to the slave control apparatus 30 through the communication port 30a with a cable, and the radio 1 is connected to the slave control apparatus 30 through the communication port 30d with a cable. Moreover, communication between the slave control apparatus 30 and the sensor 3 or the radio 1 is also point-to-point communication, and follows a predetermined communication method between the master control apparatus 20 and the slave control apparatus 30. Note that the communication ports 30b and 30c are not in use.

This radio 1 is provided with a plurality of sensors having a radio function (in this embodiment, three sensors 2a to 2c) so as to be capable of performing wireless communication therewith. Note that wireless communication between the radio 1 and each of the sensors 2a to 2c can use any suitable communication method. In the system that is formed in this manner and shown in FIG. 1A, pieces of measured data that are measured by the sensor 3 and the sensors 2a to 2c are collected in the master control apparatus 20 through the slave control apparatus 30 in accordance with instructions from the master control apparatus 20.

Note that the sensor 3 and the sensors 2a to 2c are sensors for measuring predetermined outside environment parameters (temperature, humidity, acceleration, and the like). For example, physical system sensors such as a magnetic sensor, a photoelectric sensor, a temperature sensor, a humidity sensor, an illuminance sensor, a flow sensor, a pressure sensor, a ground temperature sensor, and a particle sensor, and chemical system sensors such as a $CO_2$ sensor, a pH sensor, an EC sensor, and a soil moisture sensor can be provided in the sensors. In the present embodiment, in order to simplify the description, it is assumed that the sensor 3 and the sensors 2a to 2c are provided with only a temperature sensor for measuring the external temperature at positions at which the sensors are disposed, and data collected in the master control apparatus 20 is temperature data measured thereby.

Figure 1B:
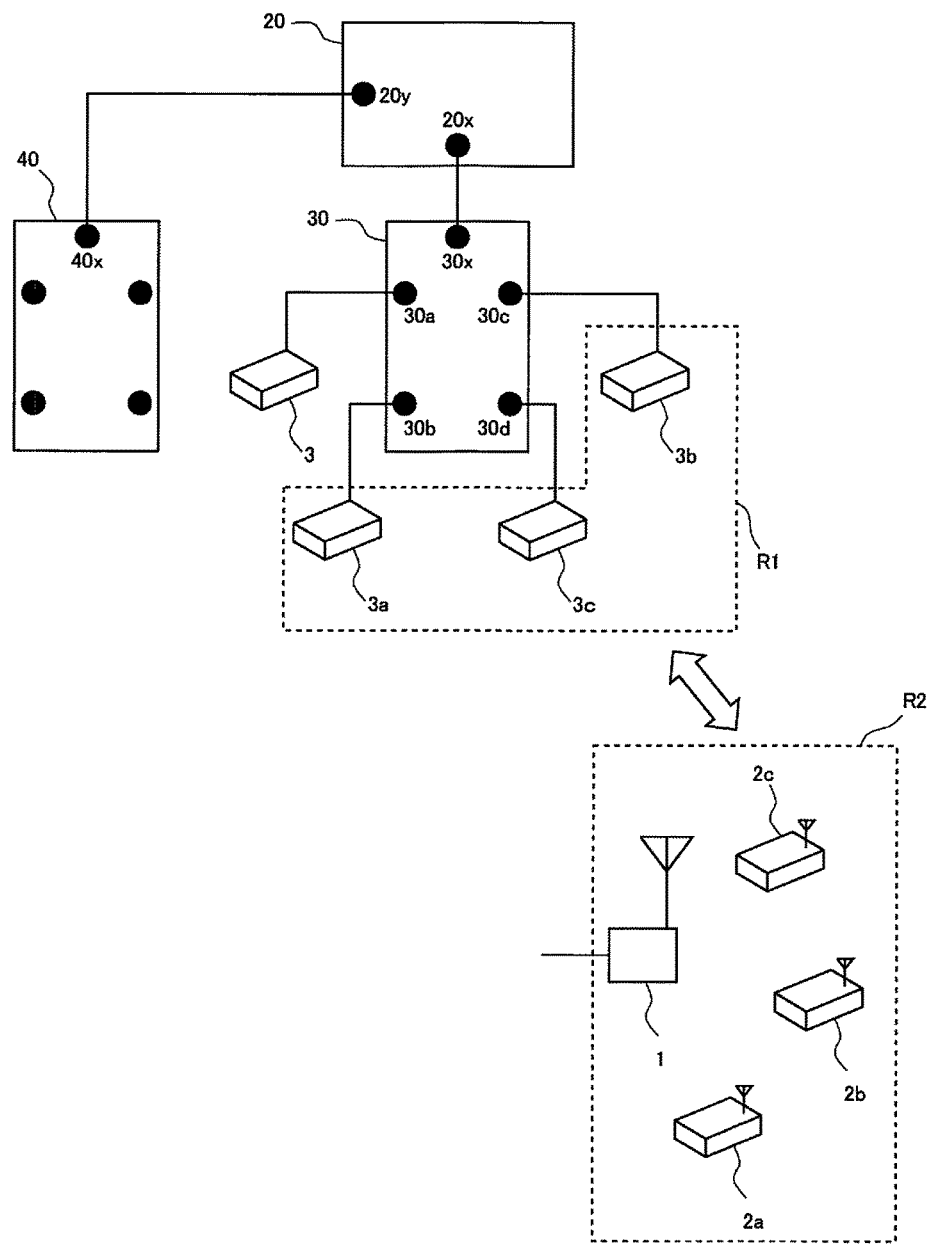
FIG. 1B is a diagram showing a schematic configuration of a system constituted by a master control apparatus and slave control apparatuses before the system, such as in FIG. 1, is formed.

Before a detailed description of the operations of the control system formed in this manner, the process leading to the formation of this control system will be described with reference to FIG. 1B. FIG. 1B is a diagram showing the mode of the control system prior to the formation of the mode shown in FIG. 1A. Although the modes of connection of the slave control apparatuses 30 and 40 to the master control apparatus 20 are the same, the mode of connection of the sensors to the slave control apparatus 30 differs from that shown in FIG. 1A. Specifically, the sensor 3 and the sensors 3a to 3c are connected to the four communication ports 30a to 30d of the slave control apparatus 30. Moreover, the sensors are connected to the slave control apparatus 30 with cables through the communication ports.

Moreover, as shown in FIG. 1B, by substituting constituent elements (that is, the sensors 3a to 3c) that are connected to the slave control apparatus 30 in a region R1 surrounded by dotted lines with constituent elements (that is, the radio 1 and the sensors 2a to 2c that are wirelessly connected to the radio 1) in a region R2 surrounded by dotted lines, the control system shown in FIG. 1A is constructed. At this time, noteworthy points are the fact that the sensors are connected to the slave control apparatus 30 via four cables before substitution, but three out of the four sensors are aggregated for connection via the radio 1 and the number of wired connections to the slave control apparatus 30 is reduced from 4 to 2 after substitution. Use of the radio 1 in this manner makes it possible to widely select locations at which the sensors 2a to 2c for wireless connection to the radio 1 are installed and to effectively execute collection of the temperature data. Also, a reduction in the number of wired connections to the slave control apparatus 30 relating to the collection of the temperature data significantly reduces constraints relating to the arrangement of control devices such as a radio and sensors, and thus from this point as well, effective collection of temperature data is realized. Note that the communication ports 30b and 30c that are no longer used in the slave control apparatus 30 due to a reduction in the number of wired connections may be utilized for connection to other control apparatuses or the like.

Meanwhile, as shown in FIG. 1A, the radio 1 and the slave control apparatus 30 are connected to each other with one cable and point-to-point communication is performed. Specifically, pieces of the temperature data that were measured by the sensors and aggregated in the radio 1 via wireless communication are transmitted from the radio 1 to the slave control apparatus 30 in accordance with a predetermined communication method between the radio 1 and the slave control apparatus 30. Thus, the temperature data measured by the sensor 2a, the temperature data measured by the sensor 2b, and the temperature data measured by the sensor 2c are all transmitted from the radio 1 to the slave control apparatus 30 through the communication port 30d with cables.

Figure 2:
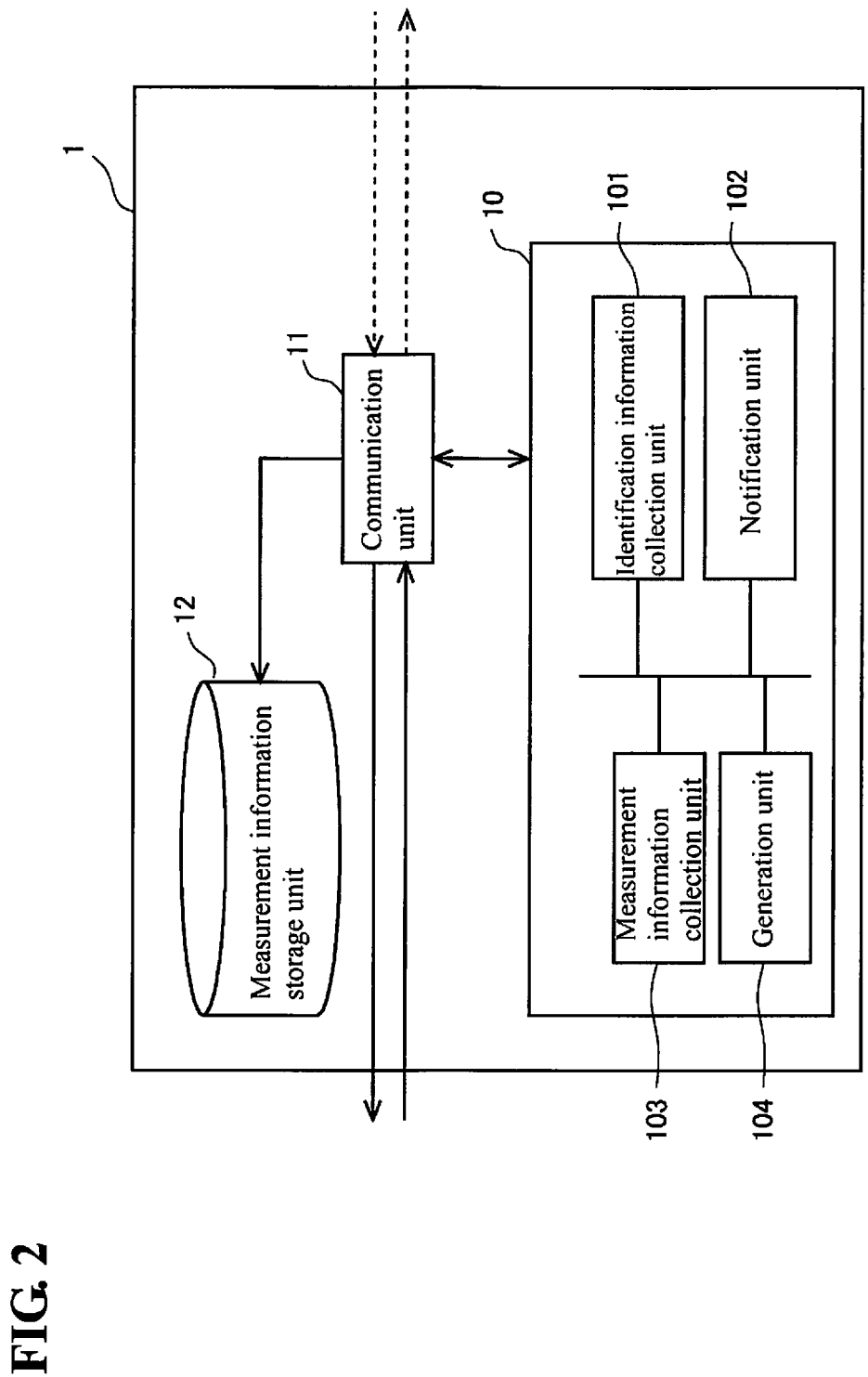
FIG. 2 is a functional block diagram of a radio 1, such as in FIG. 1A.
Figure 3:
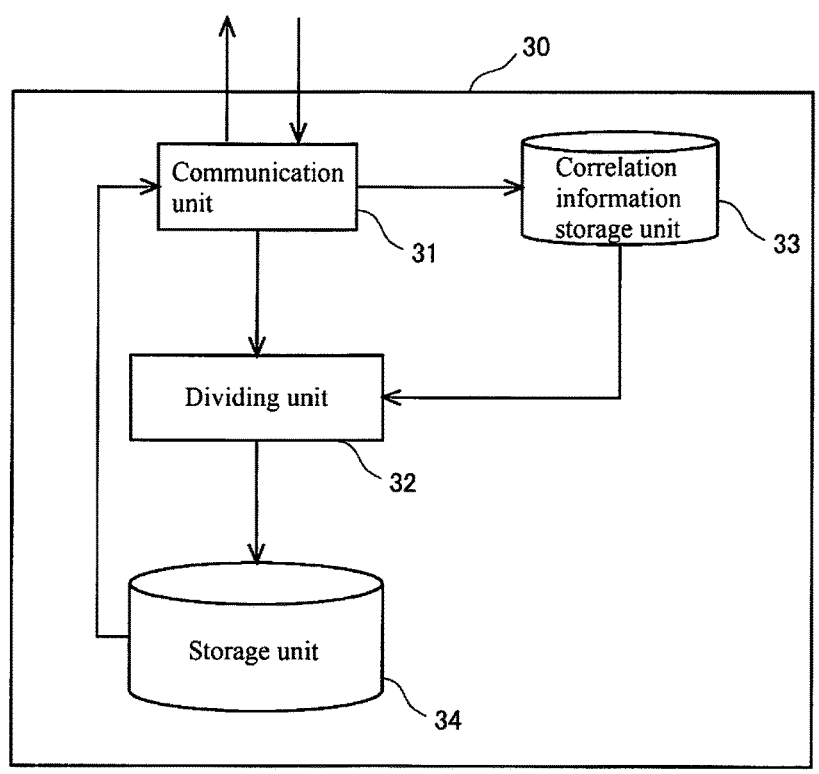
FIG. 3 is a functional block diagram of slave control apparatuses, such as in FIG. 1A.

In view of this, in the control system shown in FIG. 1A, the temperature data is transmitted from the radio 1 in a form such that the slave control apparatus 30 can grasp which sensor measured the temperature data. Thus, the radio 1 and the slave control apparatus 30 have configurations as shown in FIGS. 2 and 3. The radio 1 and the slave control apparatus 30 internally have arithmetic units, memories, and the like, and exhibit not only a wired communication function and a wireless communication function but also various functions due to a predetermined control program being executed by these arithmetic units. Moreover, FIGS. 2 and 3 are functional block diagrams showing an illustration of the functions of the radio 1 and the slave control apparatus 30. Note that although not shown, the master control apparatus 20 also has various functional units similarly to the slave control apparatus 30, some of which correspond to the functional units provided in the slave control apparatus 30. This point will be described later.

First, the radio 1 has a control unit 10, a communication unit 11, and a measurement information storage unit 12 as functional units. Hereinafter, the functional units of the radio 1 will be described. The control unit 10 is a functional unit that handles various controls in the radio 1, and in particular, has an identification information collection unit 101, a notification unit 102, a measurement information collection unit 103, and a generation unit 104. The identification information collection unit 101 is a functional unit that collects identification information for enabling identification of sensors individually when the radio 1 is connected to an object to be connected via wireless communication, that is, the radio 1 is connected to the sensors 2a to 2c for the first time. This identification information is also used in order for the slave control apparatus 30 and the master control apparatus 20 to identify sensors as will be described later, and thus has a data configuration that can be understood by these control apparatuses. For example, when the predetermined communication method between the master control apparatus 20 and the slave control apparatus 30 is the IO link method, an IODD profile corresponding to each sensor in accordance with this IO link method can be used as this identification information. Also, the notification unit 102 is a functional unit that notifies the slave control apparatus 20 of correlation information showing a correlation between the identification information of the sensors collected by the identification information collection unit 101 and the order of superimposing pieces of the temperature data measured by the sensors, which is superimposed in communication packets generated by the generation unit 103, which will be described later. A specific configuration of this correlation information will be described later.

Next, the measurement information collection unit 103 is a functional unit that collects temperature data from the sensors 2a to 2c via wireless communication, the temperature data being measurement information measured by the sensors 2a to 2c that are connected to the radio 1 so as to be capable of performing wireless communication. Collection of the temperature data collected by the measurement information collection unit 103 may be performed in accordance with an instruction given by the master control apparatus 20, or may be performed in accordance with an instruction from the radio 1 independently from the master control apparatus 20. Also, the generation unit 104 is a functional unit that generates communication packets for transmitting the temperature data measured by the measurement information collection unit 103 to the slave control apparatus 30 in accordance with a predetermined communication method. Specifically, after the pieces of temperature data measured by the sensors are stored in one communication packet in the above-described superimposition order, which is a predetermined order in time series that is determined in advance. Thus, the pieces of temperature data measured by the sensors are stored in the communication packets generated by the generation unit 104 in a state in which the pieces of temperature data is superimposed in a time-division manner. This superimposition order is information shared by not only the radio 1 but also the control apparatuses by the above-describe notification unit 102 notifying the slave control apparatus 30 and the master control apparatus 20 through the correlation information.

Also, the communication unit 11 is a functional unit that is formed so as to interact with the control unit 10 and communicates with a device external to the radio 1, that is, transmits and receives information to/from the external device. Thus, the communication unit 11 is a functional unit that performs transmission and reception with the sensors 2a to 2c via wireless communication and performs transmission and reception with the slave control apparatus 30 via wired communication. Thus, the communication unit 11 also includes a function as a transmission unit of the radio according to one or more embodiments. Also, the communication unit 11 handles reception at the time of collection of information measured by the identification information collection unit 101 and the measurement information collection unit 103, and transmission of correlation information by the notification unit 102. Note that in wireless communication performed by the communication unit 11 is expressed with dotted lines and wired communication is expressed with solid lines in FIG. 2. Also, the measurement information storage unit 12 is a functional unit that stores temperature data collected by the measurement information collection unit 103 and measured by the sensors in the memory.

Next, the functional units of the slave control apparatus 30 will be described with reference to FIG. 3. The slave control apparatus 30 has a communication unit 31, a dividing unit 32, a correlation information storage unit 33, and a storage unit 34 as the functional units. The communication unit 31 is a functional unit that performs transmission and reception with the radio 1 via wired communication and performs transmission and reception with the master control apparatus 20 via wired communication. The correlation information storage unit 33 is a functional unit that stores correlation information notified by the notification unit 102 of the radio 1. Moreover, the dividing unit 32 is a functional unit that performs division processing for dividing the temperature data that is measured by the sensors and is superimposed in communication packets transmitted from the radio 1 in accordance with the correlation information stored in the dividing unit 32, in a state in which correlation with the sensors is established. Furthermore, the storage unit 34 stores the temperature data that is measured by the sensors and divided by the dividing unit 32 in the memory. At this time, a storage region of the memory that stores the temperature data is partitioned for each sensor, and the memory address in the storage region corresponding to the sensors is determined in advance.

Also, although not shown, the master control apparatus 20 is provided with various functional units similarly to the slave control apparatus 30. In particular, the master control unit 20 includes a communication unit (a functional unit corresponding to the communication unit 31 shown in FIG. 3) that handles communication with the slave control apparatuses that are connected with cables and a correlation information storage unit (a functional unit corresponding to the correlation information storage unit 33 shown in FIG. 3) that stores correlation information transmitted from the slave control apparatus 30 as described later. In addition, the master control apparatus 20 has a control unit for executing various controls in the overall control system.

Temperature data collection processing

Figure 4:
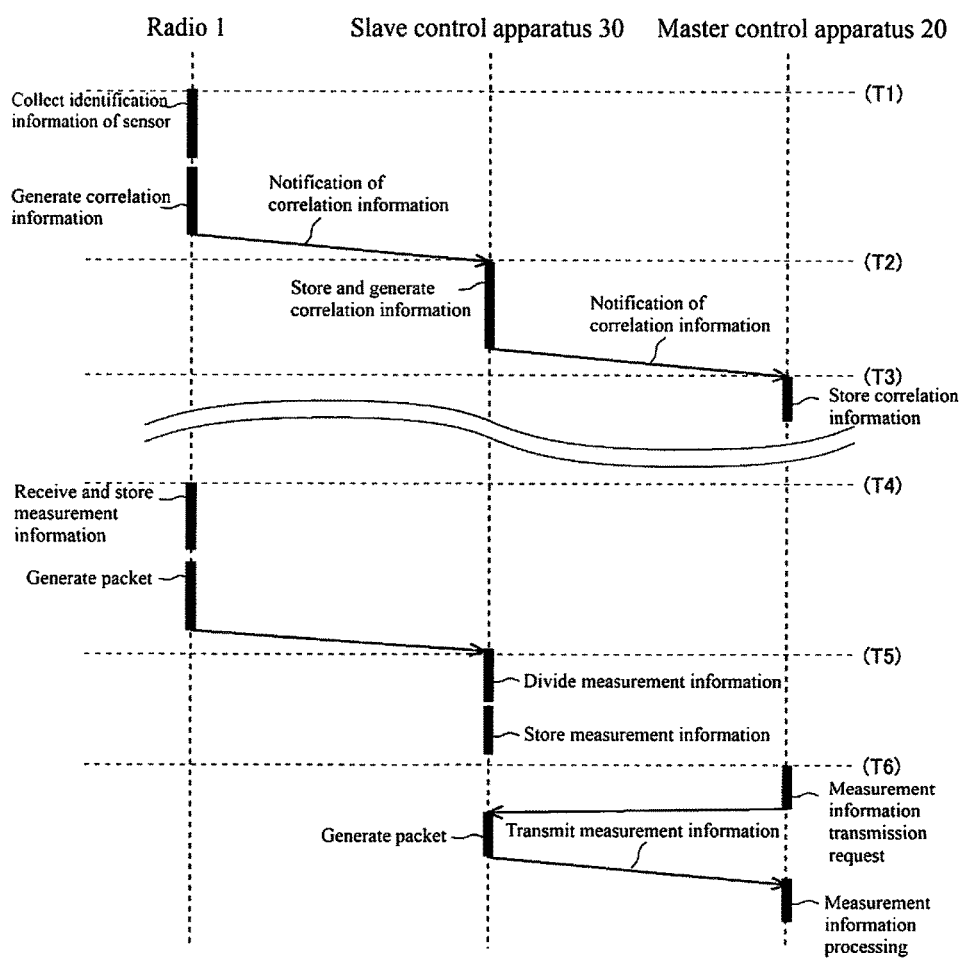
FIG. 4 is a diagram showing a sequence relating to processing for transference of measurement information that is performed between a radio 1, slave control apparatus 30, and a master control apparatus 20 in a system, such as in FIG. 1A.

Here, FIG. 4 shows a sequence diagram of processing for collecting temperature data by the control system shown in FIG. 1. Note that the sequence shown in FIG. 4 shows the flow of processing starting from a time T1 at which the sensors 3a to 3c connected to the slave control apparatus 30 in a pre-substitution state shown in FIG. 1B are switched to a state in which the sensors 2a and 2b and the slave control apparatus 30 are connected to each other via the radio 1 as shown in FIG. 1A.

First, the radio 1 is connected to the slave control apparatus 30 with a cable through the communication port 30d at the time T1. Accordingly, the radio 1 is recognized by the slave control apparatus 30, and pieces of the identification information of the sensors are collected in the radio 1 by the identification information collection unit 101, the identification information indicating a wirelessly connectable sensor. Thereafter, the above-described correlation information is generated based on the collected identification information. Here, FIG. 5A shows one example of a data configuration of the correlation information. As shown in FIG. 5A, the correlation information is information in which the superimposition order used when pieces of the temperature data measured by the sensors are superimposed in one communication packet by the generation unit 104 and the identification information of a sensor corresponding to the order are linked with each other. Here, the order in which the identification information was collected in the radio 1 by the radio 1 and the sensors 2a to 2c performing wireless communication for the first time may be used as the superimposition order. Also, as another method, if a sensor that is wirelessly connected to the radio 1 is specified in advance, correlation information is generated by linking the predetermined order and the identification information of the specified sensor. Note that the superimposition order shown in FIG. 5A is the sensors 2a, 2b, and 2c.

Moreover, when the correlation information is generated in the radio 1, the slave control apparatus 30 is notified by the notification unit 102 of this correlation information. Thereafter, the slave control apparatus 30 receives the correlation information and the correlation information storage unit 33 of the slave control apparatus 30 stores this correlation information at a time T2. Also, in the slave control apparatus 30, correlation information for notifying the master control apparatus 20 is generated based on the received correlation information. Here, FIG. 5B shows one example of a data configuration of the correlation information generated in the slave control apparatus 30. As shown in FIG. 5B, information relating to the memory address (that is, the memory address in the storage unit 34) of the slave control apparatus 30 that stores the temperature data measured by the sensors is further added to this correlation information received from the radio 1. In other words, in the slave control apparatus 30, correlation information is generated again such that the master control apparatus 20 can grasp which storage region of the memory stores the temperature data that is divided by the dividing unit 32 and corresponds to each sensor.

When the correlation information (correlation information shown in FIG. 5B) is generated again in the slave control apparatus 30, the slave control apparatus 30 notifies the master control apparatus 20 of this correlation information. Thereafter, the master control apparatus 20 receives the correlation information and stores the correlation information in the memory thereof at a time T3.

In this manner, processes from the time T1 to the time T3 shown in FIG. 4 are pre-processing for collecting temperature data performed by the control system. Processes at a time T4 onward, which will be described later, are processes for actually collecting temperature data.

First, the radio 1 collects the pieces of temperature data that were measured by the sensors at the time T4 using the measurement information collection unit 103. The collected temperature data is stored in the measurement information storage unit 12. Thereafter, a communication packet for transmitting the temperature data stored in the measurement information storage unit 12 to the slave control apparatus 30 is generated by the generation unit 104. As described above, in the generation of this communication packet, the pieces of temperature data measured by the sensors are successively superimposed and stored in a time-division manner in the communication packet in accordance with the superimposition order determined in the correlation information shown in FIG. 5A.

Then, when the communication packet is generated in the radio 1, this communication packet is transmitted to the slave control apparatus 30. Thereafter, the slave control apparatus 30 receives this communication packet at a time T5. In the slave control apparatus 30, division processing is performed by the dividing unit 32 on the received communication packet, and the temperature data superimposed in the communication packet is divided in a state in which the temperature is linked with the sensor that performed measurement. As described above, this division processing can be performed based on the correlation information shown in FIG. 5B.

Furthermore, after the division processing, the divided temperature data is stored in the storage unit 34. At this time, the divided temperature data for each sensor is stored in the storage region of the corresponding memory address shown in the correlation information in FIG. 5B. Therefore, for example, the temperature data measured by the sensor 2a is stored in the storage region whose memory address is specified as x000010, and is distinguished from the pieces of temperature data measured by the sensor 2b and the sensor 2c.

Note that although the number of instances of transmission of the temperature data from the radio 1 to the slave control apparatus 30 is only one in FIG. 4, collection of the temperature data by the radio 1 and transmission of the collected data to the slave control apparatus 30 are repeated at appropriate time intervals. Moreover, the transmitted temperature data is successively stored in the storage region that is partitioned for each sensor as long as the memory of the slave control apparatus 30 has a sufficient storage capacity.

Then, the master control apparatus 20 requests the slave control apparatus 30 to transmit the temperature data measured by the sensors at a time T6. At this time, if the master control apparatus 20 wants to request only the temperature data measured by a sensor that is required by the master control apparatus 20 itself, the master control apparatus 20 can designate the memory address corresponding to this sensor based on the correlation information (correlation information shown in FIG. 5B) notified by the slave control apparatus 30, and can make a temperature data transmission request. Of course, the master control apparatus 20 may make a request to simultaneously transmit the pieces of temperature data measured by all of the sensors.

The slave control apparatus 30 that has received this transmission request generates a communication packet including the temperature data stored in the storage unit 34 and transmits the generated communication packet to the master control apparatus 20. Then, the master control apparatus 20 that has received the communication packet executes measurement information processing with use of the temperature data as appropriate. Note that data transmission from the slave control apparatus 30 to the master control apparatus 20 need only be performed as appropriate in accordance with a predetermined communication method that is performed between the two control apparatuses. At this time, the relationship between the sensor that has performed measurement and the temperature data is maintained in a linked state.

In the control system shown in FIG. 1A in this manner, effective collection of the temperature data is realized by information collection with use of wireless communication and reducing the number of wired connections between the slave control apparatus 30 and the sensors 2a to 2c that are devices for information collection. In particular, transmission of the temperature data between the radio 1 that aggregates the temperature data and the slave control apparatus 30 is performed in a state in which the sensors are substantively distinguished from one another while the pieces of temperature data are aggregated, and thus aggregating of the temperature data by the radio 1 can be suitably executed.

Also, when the substitution state shown in FIG. 1B is substituted with the connection state shown in FIG. 1A, in particular, by automatically performing pre-processing at the time T1 to the time T3 shown in FIG. 4, it is possible to execute aggregating of the temperature data by the radio 1 while suppressing the load of introducing the control system shown in FIG. 1A on a user as much as possible.

Modification

Although division processing is performed on the communication packet transmitted from the radio 1 in the slave control apparatus 30 in the embodiments above, instead of this mode, the slave control apparatus 30 may transfer this communication packet directly to the master control apparatus 20. The master control apparatus 20 has the correlation information shown in FIG. 5B, and thus can execute division processing similarly to the dividing unit 32 of the slave control apparatus 30. Accordingly, in the mode according to this modification as well, the master control apparatus 20 can grasp which sensor measured the temperature data even if the pieces of temperature data are aggregated and collected via the radio 1.

INDEX TO THE REFERENCE NUMERALS

1 Radio
2a, 2b, 2c Sensor
20 Master control apparatus
30, 40 Slave control apparatus

The invention claimed is:

1. A system comprising:
a radio;
a slave control apparatus; and
a master control apparatus, wherein
the radio comprises a processor configured with a program to perform operations comprising:
operation as a connection unit that connects the radio to the slave control apparatus such that wired communication can be performed through one communication port among a plurality of communication ports provided in the slave control apparatus;
operation as a storage unit that:
receives, via wireless communication, a plurality of pieces of measured data that were respectively measured by a plurality of sensors, and
stores the plurality of pieces of measured data;

operation as a generation unit that:
  generates one communication packet comprising the plurality of pieces of measured data, and correlation information that indicates a predetermined order in which each one of the plurality of pieces of measured data are superimposed in the one communication packet, to enable:
    the slave control apparatus, communicably coupled to the master control apparatus with a predetermined communication method, to determine, based on receiving the correlation information of the one communication packet, which sensor of the plurality of sensors measured each one of the plurality of pieces of measured data and to generate updated correlation information, wherein the updated correlation information comprises a memory address corresponding to a location in a memory where each one of the plurality of pieces of measured data is stored, and
    the master control apparatus, based on the updated correlation information generated by the slave control apparatus, to determine which sensor of the plurality of sensors measured each one of the plurality of pieces of measured data; and
  operation as a transmission unit that transmits the one communication packet generated by the generation unit to the slave control apparatus via the wired communication; and
the slave control apparatus comprises a processor configured with a program to perform operations comprising:
operation as a reception unit that receives the one communication packet; and
operation as a dividing unit that performs division processing on each of the plurality pieces of measured data that are included in the one communication packet received by the reception unit, based on the predetermined order, into a state in which each of the plurality of pieces of measured data is linked with a corresponding one of the plurality of sensors.

2. The system according to claim 1 wherein the processor of the radio is further configured with the program to perform operations comprising:
  operation as an identification information collection unit that collects pieces of identification information for respectively identifying individual sensors from the plurality of sensors, when the radio is initially connected to the plurality of sensors via the wireless communication; and
  operation as a notification unit that notifies the slave control apparatus or the master control apparatus of the pieces of identification information of the plurality of sensors collected by the identification information collection unit and the correlation information, when the radio is initially connected to the slave control apparatus via the wired communication.

3. The system according to claim 2, wherein the slave control apparatus transmits, to the master control apparatus, the pieces of measured data included in the one communication packet transmitted from the transmission unit, in a state in which each piece of the measured data is linked with a corresponding one of the plurality of sensors, based on the updated correlation information.

4. The system according to claim 1,
  wherein the slave control apparatus is connected to the master control apparatus such that wired communication can be performed through a second communication port that is different from the one communication port among the plurality of communication ports provided in the slave control apparatus.

5. The system according to claim 1,
  wherein the radio is integrally formed with the slave control apparatus.

* * * * *